(12) United States Patent
Kikugawa

(10) Patent No.: US 8,908,099 B2
(45) Date of Patent: Dec. 9, 2014

(54) AUDIO PROCESSING APPARATUS AND AUDIO PROCESSING METHOD

(71) Applicant: Kabushiki Kaisha Toshiba, Tokyo (JP)

(72) Inventor: Yusaku Kikugawa, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/860,373

(22) Filed: Apr. 10, 2013

(65) Prior Publication Data

US 2013/0314599 A1 Nov. 28, 2013

(30) Foreign Application Priority Data

May 22, 2012 (JP) ................................ 2012-117026

(51) Int. Cl.
| | |
|---|---|
| *H04N 9/64* | (2006.01) |
| *H04N 5/91* | (2006.01) |
| *H04H 60/04* | (2008.01) |
| *H04H 60/65* | (2008.01) |
| *H04H 60/58* | (2008.01) |
| *H04H 60/59* | (2008.01) |
| *G11B 20/00* | (2006.01) |

(52) U.S. Cl.
CPC ............. *H04N 5/91* (2013.01); *H04H 60/04* (2013.01); *H04H 60/65* (2013.01); *H04H 60/58* (2013.01); *H04H 60/59* (2013.01); *G11B 20/00* (2013.01)
USPC ........................................................ 348/571

(58) Field of Classification Search
USPC .................. 348/571, 738, 552, 555; 600/532
See application file for complete search history.

(56) References Cited

U.S. PATENT DOCUMENTS

| | | | | |
|---|---|---|---|---|
| 5,027,404 | A * | 6/1991 | Taguchi | 704/221 |
| 5,337,752 | A * | 8/1994 | Reeves | 600/513 |
| 6,261,238 | B1 * | 7/2001 | Gavriely | 600/532 |
| 7,522,967 | B2 * | 4/2009 | Zhang et al. | 700/94 |
| 7,565,679 | B2 * | 7/2009 | Chevallier et al. | 725/134 |
| 2004/0218096 | A1 * | 11/2004 | Kondo et al. | 348/555 |
| 2009/0154896 | A1 | 6/2009 | Matono | |
| 2009/0304088 | A1 | 12/2009 | Kodaka | |
| 2010/0185308 | A1 | 7/2010 | Yoshida et al. | |
| 2013/0027502 | A1 * | 1/2013 | Skramstad | 348/14.01 |
| 2013/0136336 | A1 * | 5/2013 | Heng | 382/154 |

FOREIGN PATENT DOCUMENTS

| | | |
|---|---|---|
| JP | 2005-086537 A | 3/2005 |
| JP | 2009-065587 A | 3/2009 |
| JP | 2009-130854 A | 6/2009 |
| JP | 2009-147768 A | 7/2009 |
| JP | 2009-296274 A | 12/2009 |
| JP | 2010-187363 A | 8/2010 |

* cited by examiner

*Primary Examiner* — Paulos M Natnael
(74) *Attorney, Agent, or Firm* — Knobbe, Martens, Olson & Bear LLP

(57) ABSTRACT

An audio processing apparatus includes a compositional pattern determining module and an audio processor. The compositional pattern determining module is configured to estimate a compositional pattern of an input video signal. The audio processor is configured to perform audio processing according to the estimation.

4 Claims, 15 Drawing Sheets

US 8,908,099 B2

1

AUDIO PROCESSING APPARATUS AND AUDIO PROCESSING METHOD

CROSS REFERENCE TO RELATED APPLICATION(S)

This application is based upon and claims the benefit of priority from Japanese Patent Application No. 2012-117026 filed on May 22, 2012, the entire contents of which are incorporated herein by reference.

TECHNICAL FILED

Embodiments described herein relate generally to an audio processing apparatus and an audio processing method which operate in link with video.

BACKGROUND

In recent years, portable electronic devices such as TV receivers, mobile personal computers such as a laptop computer, and tablet computers have been developed. In such electronic devices, not only are input video signals and audio signals reproduced as they are, some of them may be reproduced after being subjected to certain processing.

DETAILED DESCRIPTION

According to one embodiment, an audio processing apparatus includes a compositional pattern determining module and an audio processor. The compositional pattern determin-

2 ing module is configured to estimate a compositional pattern of an input video signal. The audio processor is configured to perform audio processing according to the estimation.

Various embodiments will be described hereinafter with reference to the accompanying drawings.

Figure 1:
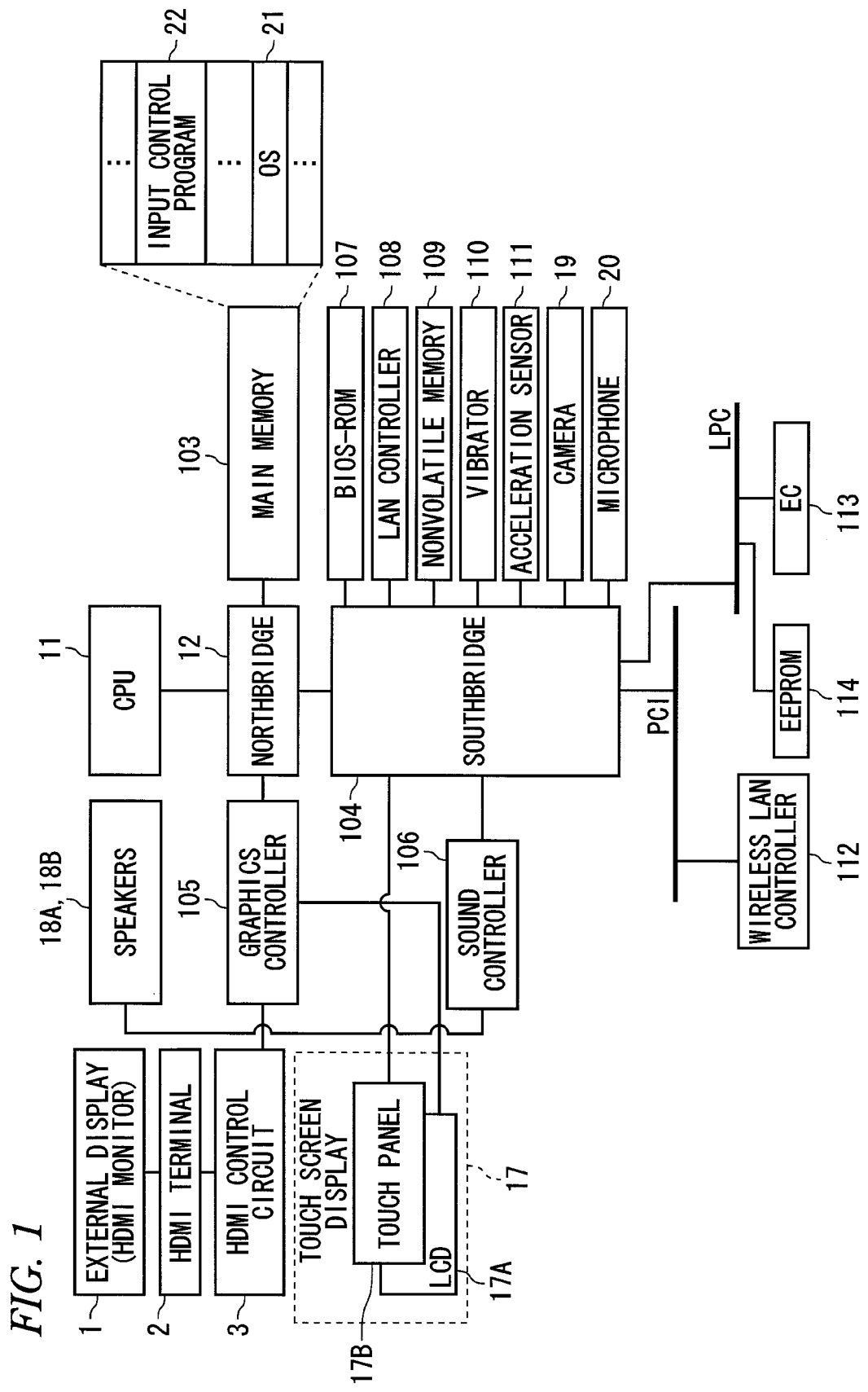
FIG. 1 is a block diagram showing the system configuration of an electronic device according to an embodiment of the present invention.

FIG. 1 is a block diagram showing the system configuration of a computer 10. As shown in FIG. 1, the computer 10 is equipped with a CPU 11, a northbridge 12, a main memory 103, a southbridge 104, a graphics controller 105, a sound controller 106, a BIOS-ROM 107, a LAN controller 108, a nonvolatile memory 109, a vibrator 110, an acceleration sensor 111, a wireless LAN controller 112, an embedded controller (EC) 113, an EEPROM 114, an HDMI control circuit 3, etc.

The CPU 11 is a processor which controls the operations of individual elements of the computer 10. The CPU 11 executes an operating system (OS) 21 and various application programs which are loaded into the main memory 103 from the nonvolatile memory 109. The application programs include an input control program 22. The input control program 22 is software for performing key input processing using a virtual keyboard and runs on the OS 21.

Also, the CPU 11 runs a BIOS stored in the BIOS-ROM 107. The BIOS is programs for hardware control.

The northbridge 12 is a bridge device which connects a local bus of the CPU 11 to the southbridge 104. The northbridge 12 incorporates a memory controller for access-controlling the main memory 103. The northbridge 12 also has a function of performing a communication with the graphics controller 105 via, for example, a serial bus that complies with the PCI Express standard.

The graphics controller 105 is a display controller which controls an LCD 17A which is used as a display monitor of the computer 10. Display signals generated by the graphics controller 105 are sent to the LCD 17A. The LCD 17A displays video based on the display signals. A touch panel 17B is disposed on the LCD 17A. The touch panel 17B is a pointing device for allowing input through the screen of the LCD 17A. A user can manipulate, for example, a graphical user interface (GUI) displayed on the screen of the LCD 17A using the touch panel 17B. For example, the user can command execution of a function corresponding to a button that is displayed on the screen by touching it.

An HDMI terminal 2 is an external display connection terminal. The HDMI terminal 2 can send non-compressed digital video signals and digital audio signals to an external display 1 via a single cable. The HDMI control circuit 3 is an interface for sending digital video signals to the external display 1 (called an HDMI monitor) via the HDMI terminal 2. That is, the computer 10 can be connected to the external display 1 via the HDMI terminal 2, etc.

The southbridge 104 controls individual devices on a PCI (Peripheral Component Interconnect) bus and individual devices on an LPC (Low Pin Count) bus. The southbridge 104 incorporates an ATA controller for controlling the nonvolatile memory 109.

The southbridge 104 also incorporates a USB controller for controlling various USB devices. The southbridge 104 further has a function of performing a communication with the sound controller 106. The sound controller 106, which is a sound source device, outputs audio data to be reproduced to speakers 18A and 18B. The LAN controller 108 is a wired communication device which performs a wired communication according to the IEEE 802.3 standard, for example. On the other hand, the wireless LAN controller 112 is a wireless communication device which performs a wireless communication according to the IEEE 802.11 standard, for example.

The EC 113 is a one-chip microcomputer including an embedded controller for power management. The EC 113 has a function of powering on/off the computer 10 in response to a user's manipulation of a power button.

Figure 2:
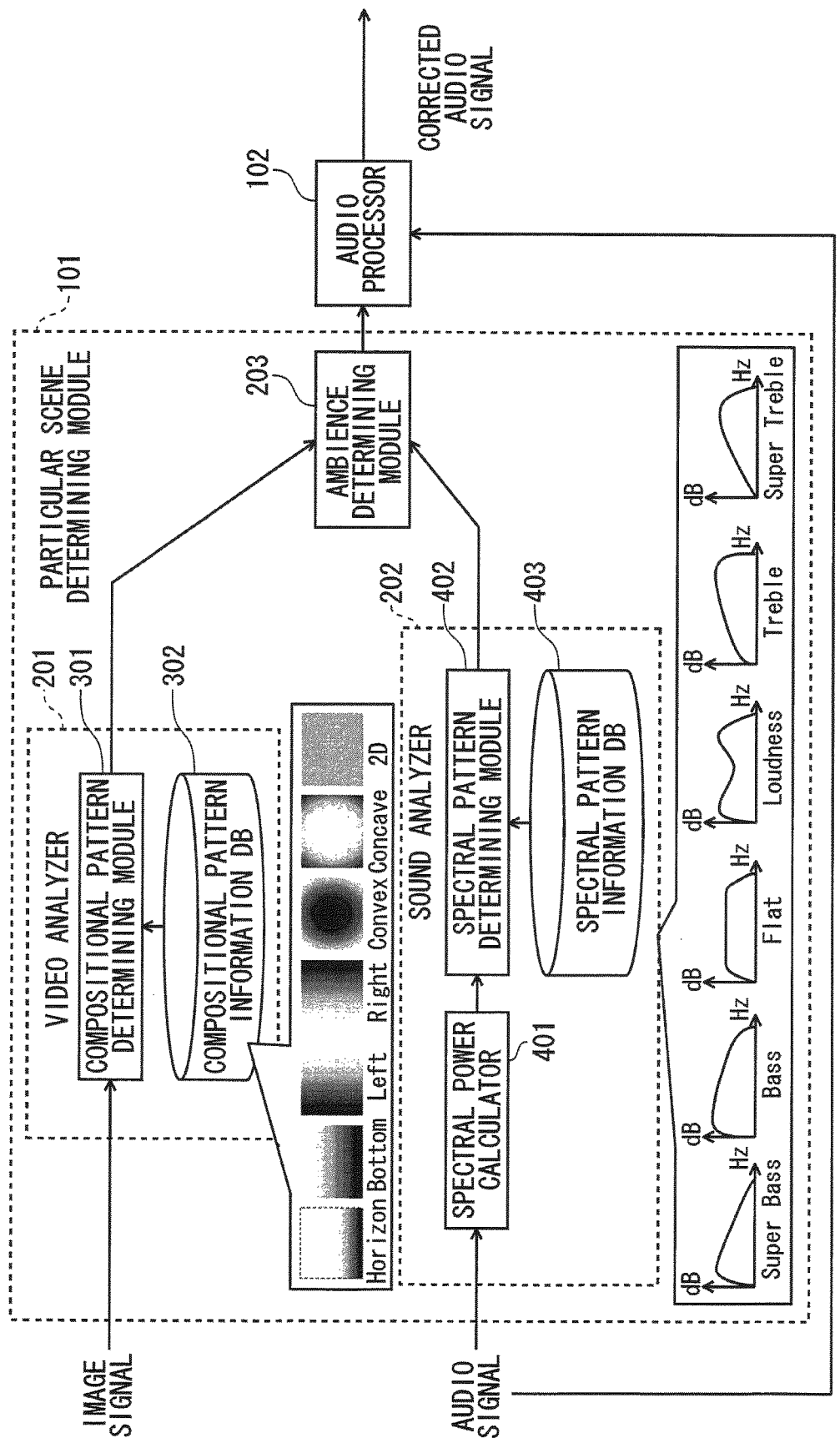
FIG. 2 is a block diagram showing the overall processing configuration according to the embodiment.
Figure 15:
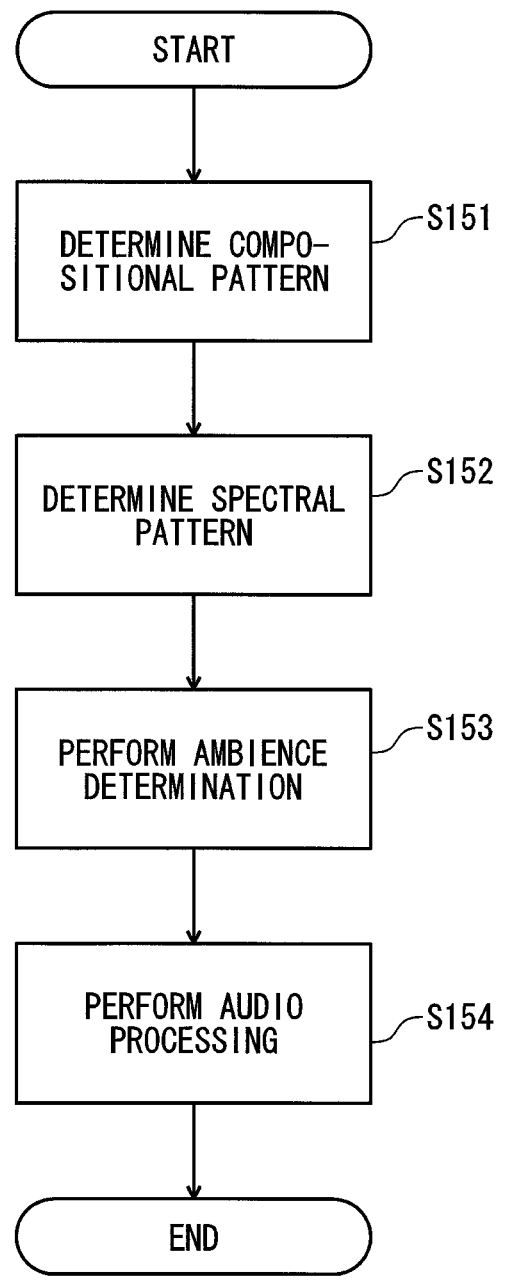
FIG. 15 is a flowchart of a process executed by the processing configuration of FIG. 2.

FIG. 2 shows the overall processing configuration according to the embodiment, and individual modules, etc. will be described later in detail. FIG. 15 is a flowchart of a process which is mainly executed by the CPU 11.

Step S151: A video analyzer 201 performs a video analysis on an input video signal and thereby determines its compositional pattern.

Step S152: On the other hand, a sound analyzer 202 performs a sound analysis on an input audio signal and thereby determines its spectral pattern.

Step S153: An ambience determining module 203 performs an ambience determination based on the thus-determined compositional pattern and spectral pattern.

Step S154: An audio processor 102 performs audio processing based on the result of the ambience determination.

Figure 3:
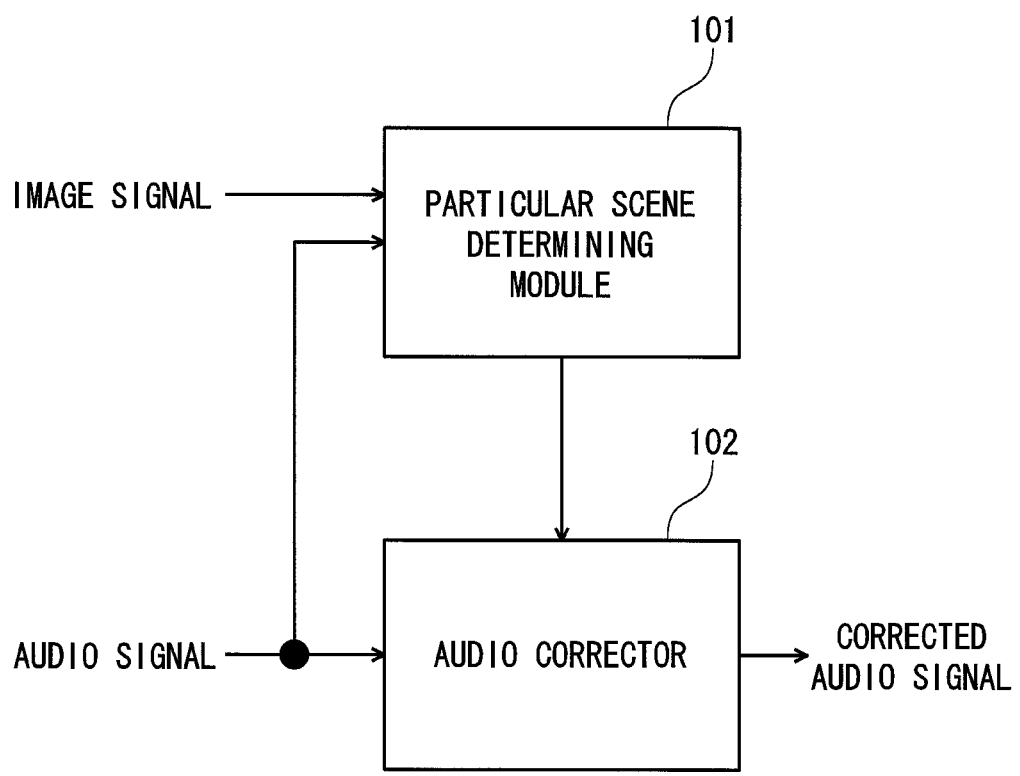
FIG. 3 is a block diagram showing the basic concept of the processing configuration according to the embodiment.

With regard to the individual modules, etc., FIG. 3 shows the basic concept of the processing configuration according to the embodiment. The basic concept includes a particular scene determining module 101 (may be provided in the CPU 11) and the audio processor (audio corrector) 102 (may be provided in the sound controller 106). The particular scene determining module 101 performs a particular scene determination, and the audio processor (audio corrector) 102 changes the audio processing according to the result of the particular scene determination.

The particular scene determination can be performed more accurately for particular scenes in a wider range by using both of an image signal and an audio signal. The audio processor 102 may perform any processing so as long as the processing is suitable for the particular scenes. The processing executed by the audio processor 102 include, for example, filter processing for reproducing sound field characteristics of a room, a concert hall, or the like, processing of adding reverberations, voice emphasis processing such as formant emphasis, non-vocal sound emphasis processing, surround processing such as HRTF, equalizer processing, and dynamic range control.

Figure 4:
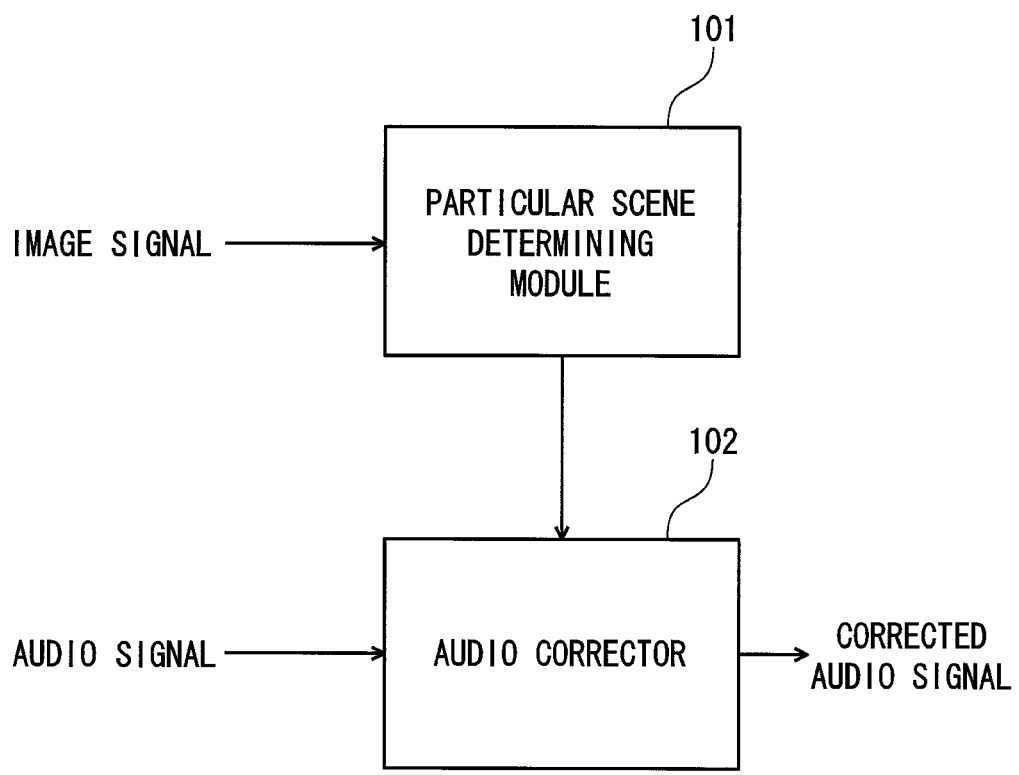
FIG. 4 is a block diagram showing a first modification of the processing configuration of FIG. 3.
Figure 5:
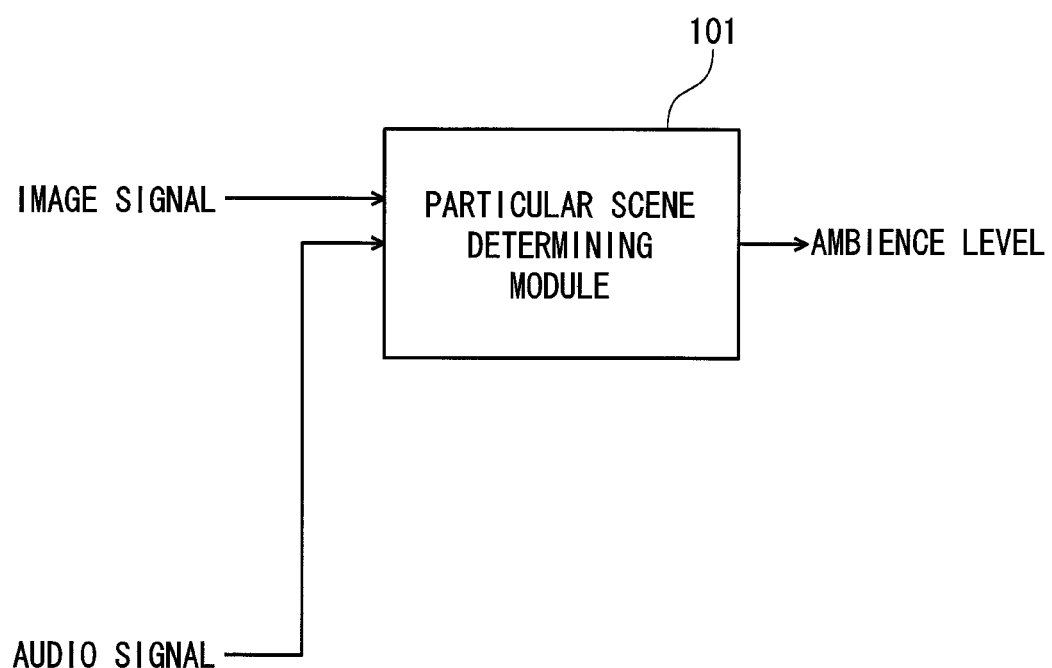
FIG. 5 is a block diagram showing a second modification of the processing configuration of FIG. 3.

FIGS. 4 and 5 show modifications of the processing configuration of FIG. 3. In order to reduce a processing amount, in the processing configuration of FIG. 4, the particular scene determination is performed using only the image signal without the audio signal. Also, in the processing configuration of FIG. 5, the result of the particular scene determination is output as it is as tag information (e.g., a numerical value in a range of 1 to 10 or one of categories such as "low," "medium," and "high") of an ambience level to notify a user as to whether or not a content requires an ambience.

In another modification of the processing configurations of FIGS. 4 and 5, the particular scene determination may be performed using only the image signal without the audio signal, and a result of the particular scene determination may be output as it is as tag information of an ambience level.

Figure 6:
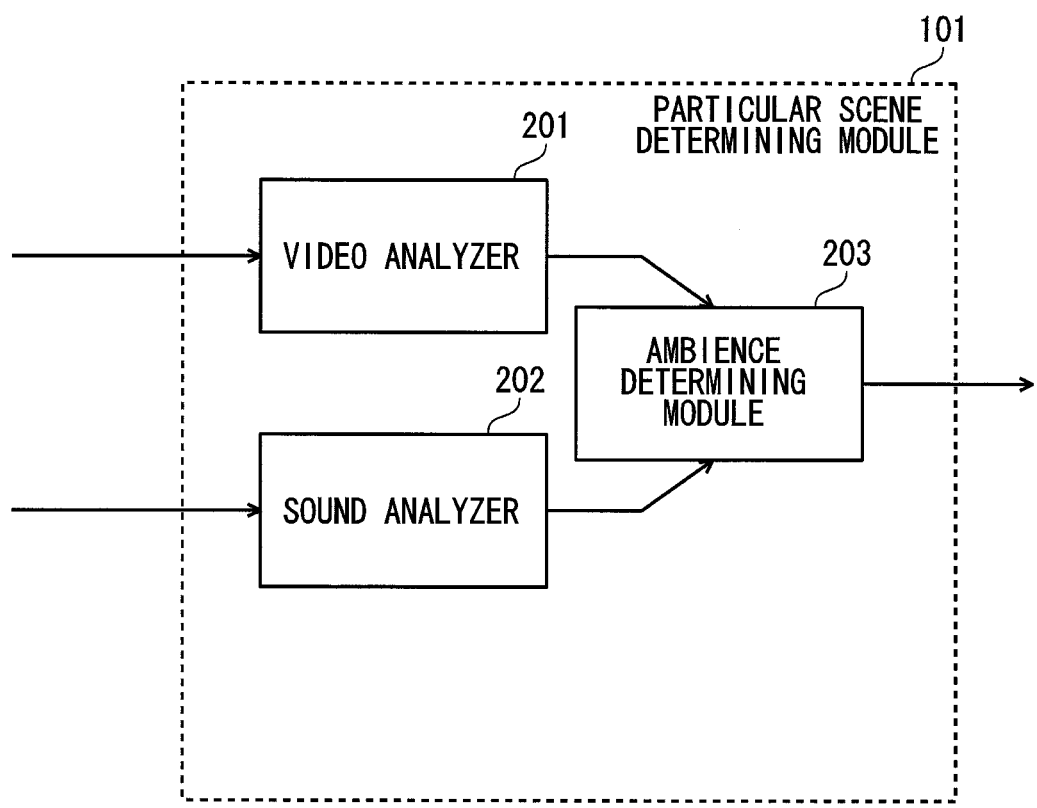
FIG. 6 is a block diagram showing the processing configuration of a particular scene determining module according to the embodiment.
Figure 7:
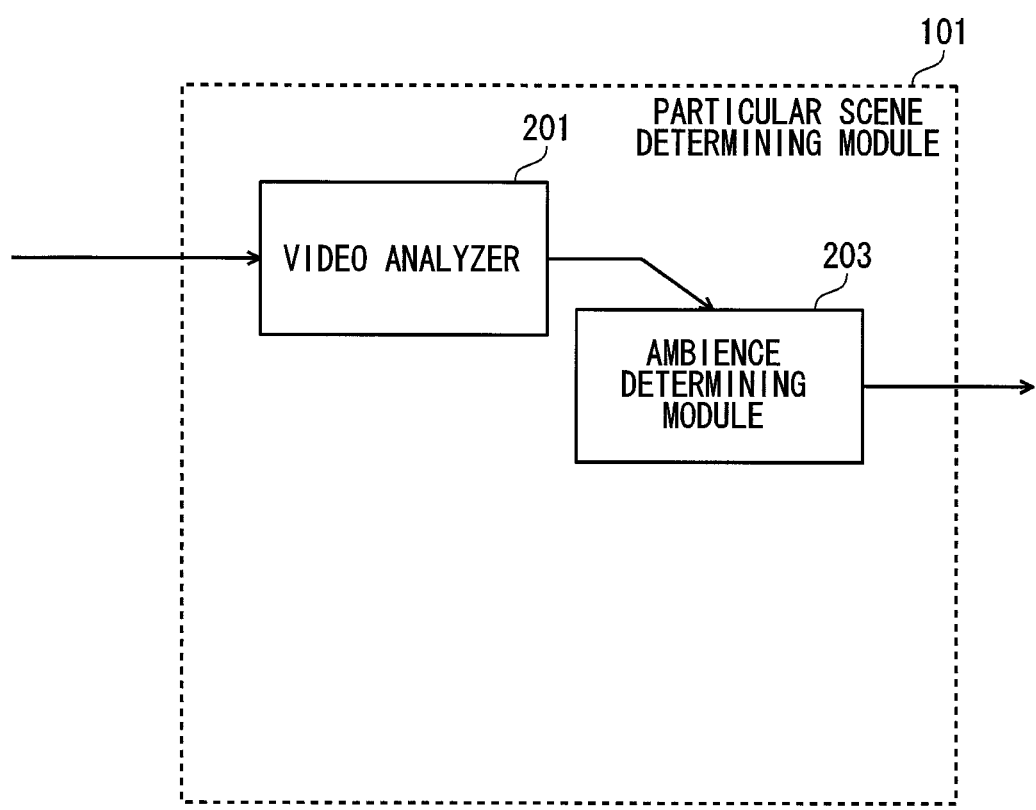
FIG. 7 is a block diagram showing a modification of the particular scene determining module of FIG. 6.

FIG. 6 shows the processing configuration of the particular scene determining module 101. The particular scene determining module 101 includes the video analyzer 201, the sound analyzer 202, and the ambience determining module 203. An image signal analysis result of the video analyzer 201 and an audio signal analysis result of the sound analyzer 202 are input to the ambience determining module 203. Then, the ambience determining module 203 performs an ambience determination, that is, determines as to whether a scene is a particular scene for which audio processing should be performed or a non-particular scene for which audio processing should not be performed, and outputs information indicating as to whether or not an ambience is necessary. FIG. 7 shows a modification of the particular scene determining module 101 of FIG. 6. In order to reduce the processing amount, in the processing configuration of FIG. 7, only the image signal analysis result of the video analyzer 201 is input to the ambience determining module 203.

Figure 8:
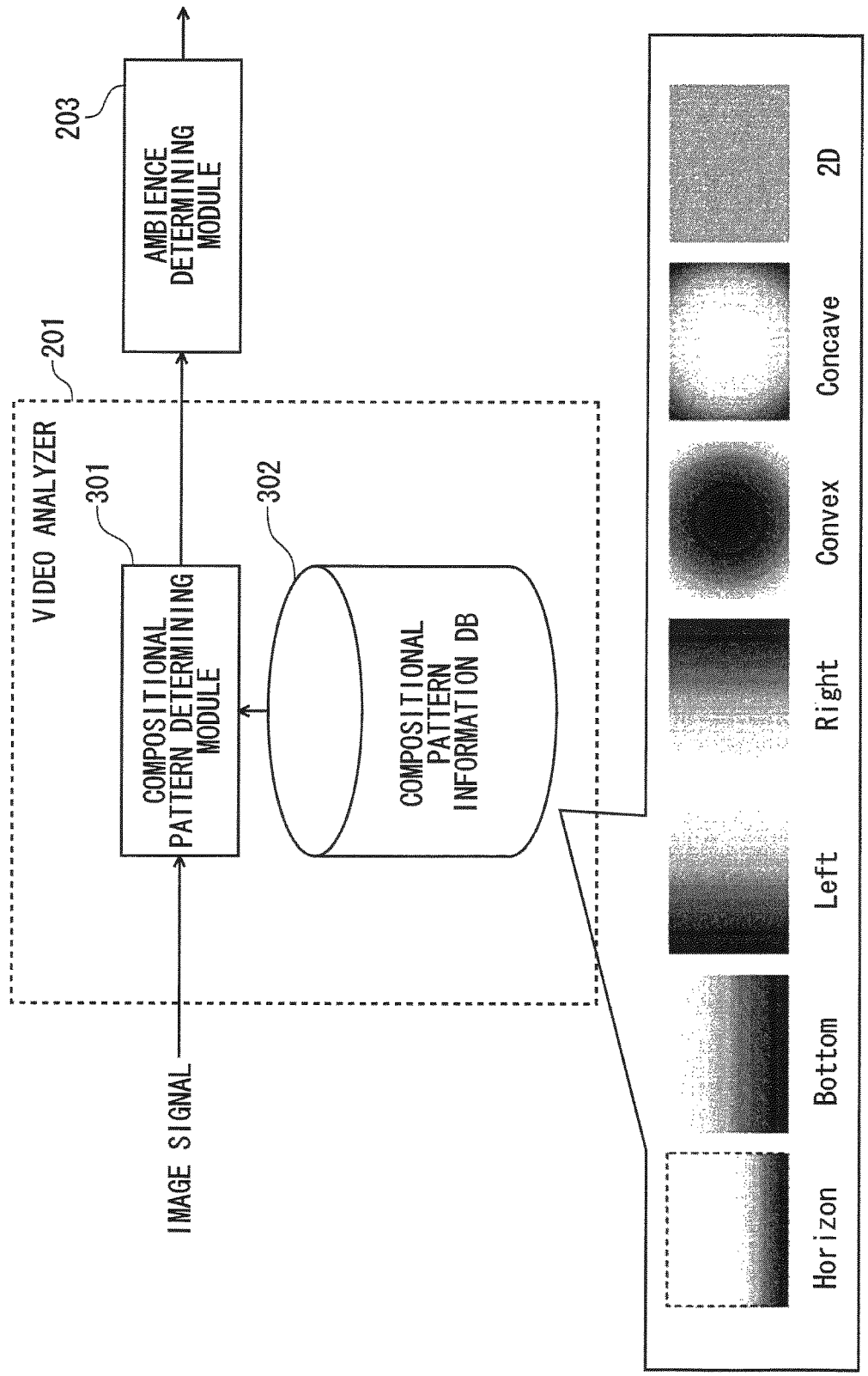
FIG. 8 is a block diagram showing the processing configuration of a video analyzer according to the embodiment.

FIG. 8 shows the processing configuration of the video analyzer 201. The video analyzer 201 includes a compositional pattern determining module 301 and a compositional pattern information database (DB) 302. The compositional pattern determining module 301 determines a compositional pattern of an image signal and determines which of compositional patterns (e.g., ones shown in FIG. 8) contained in the compositional pattern information DB 302 the determined compositional pattern is closest to. For example, if the composition pattern determining module 301 determines that the compositional pattern of the image signal is closest to "horizon," it is likely that the image signal corresponds to a soccer game watching scene, a scene of looking down on a landscape, or the like. Therefore, the ambience determining module 203 determines that an ambience is necessary.

Figure 9:
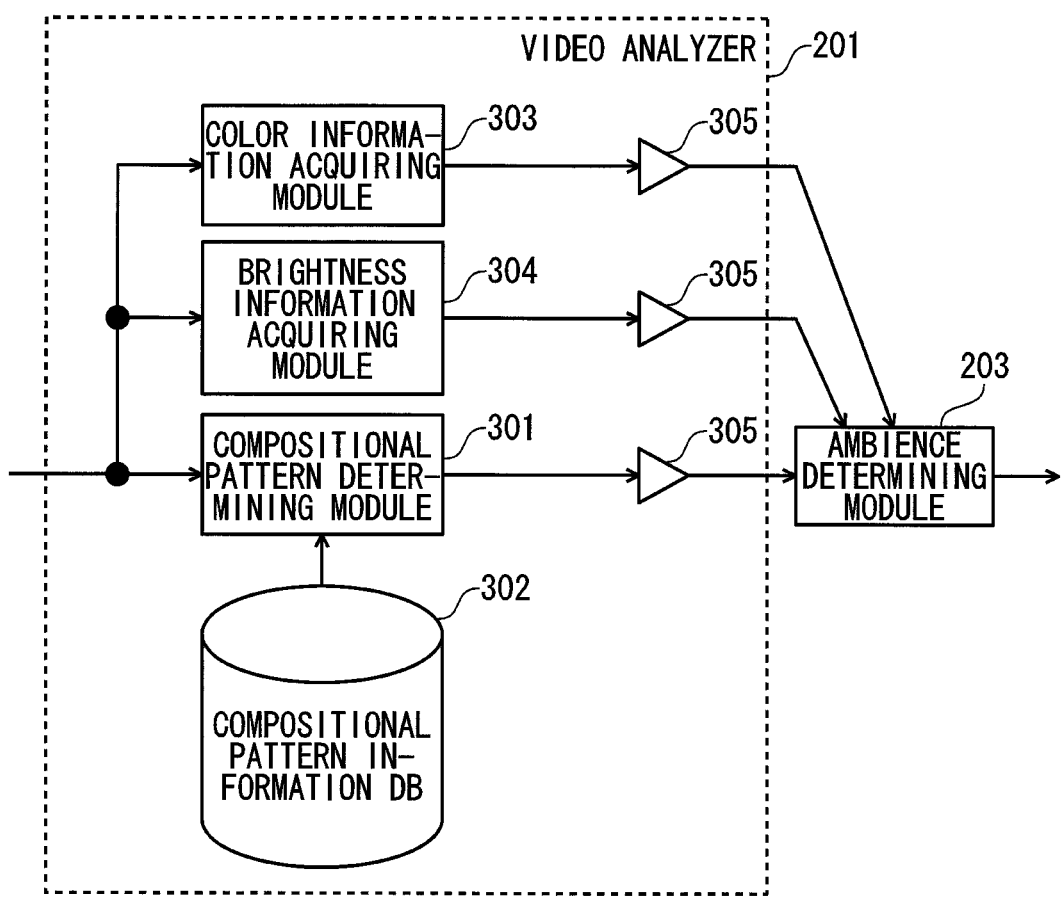
FIG. 9 is a block diagram showing a first modification of the video analyzer of FIG. 8.
Figure 10:
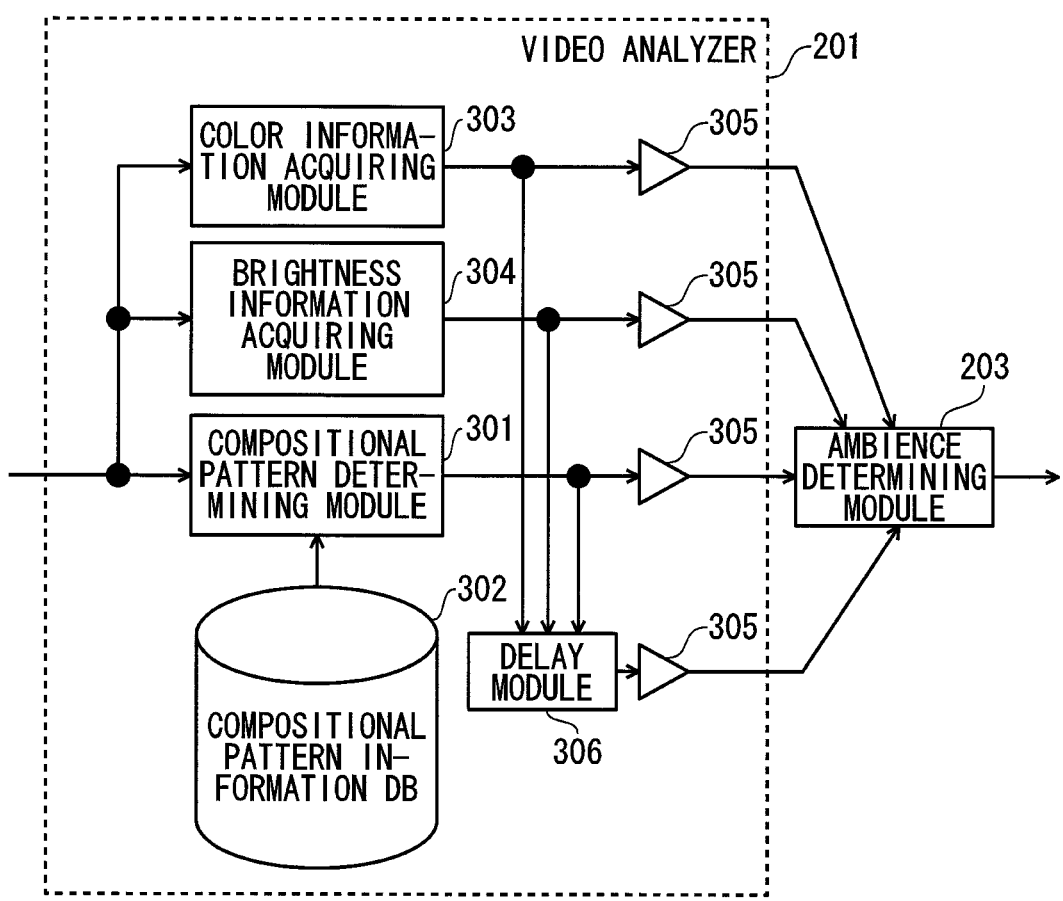
FIG. 10 is a block diagram showing a second modification of the video analyzer of FIG. 8.

FIGS. 9 and 10 show modifications of the video analyzer 201 of FIG. 8. The video analyzer 201 of FIG. 9 further includes a color information acquiring module 303 and a brightness information acquiring module 304 in addition to the configuration of the video analyzer 201 of FIG. 8. The video analyzer 201 of FIG. 10 further includes a delay module 306 in addition to the configuration of the video analyzer 201 of FIG. 9.

In the video analyzer 201 of FIG. 9, the color information acquiring module 303 acquires color information from the image signal, and the brightness information acquiring module 304 acquires brightness information from the image signal. The ambience determining module 203 determines as to whether or not an ambience is necessary, based on the acquired color information and the acquired brightness information as well as the composition pattern. With use of the color information and the brightness information, if, for example, the main component of the color information is blue or green and the brightness information is "bright," it is likely that the image signal corresponds to an outdoor scene. Therefore, the ambience determining module 203 determines that an ambience is necessary. Priorities may be put on the information to be subjected to the video analysis by multiplying the composition information, the color information and the brightness information by weight coefficients in nodes 305.

In the video analyzer 201 of FIG. 10, the delay module 306 enables use of past information of an image. Since the video analyzer 201 can acquire, for example, scene change information, the audio processing can be switched smoothly in the time-axis direction.

Figure 11:
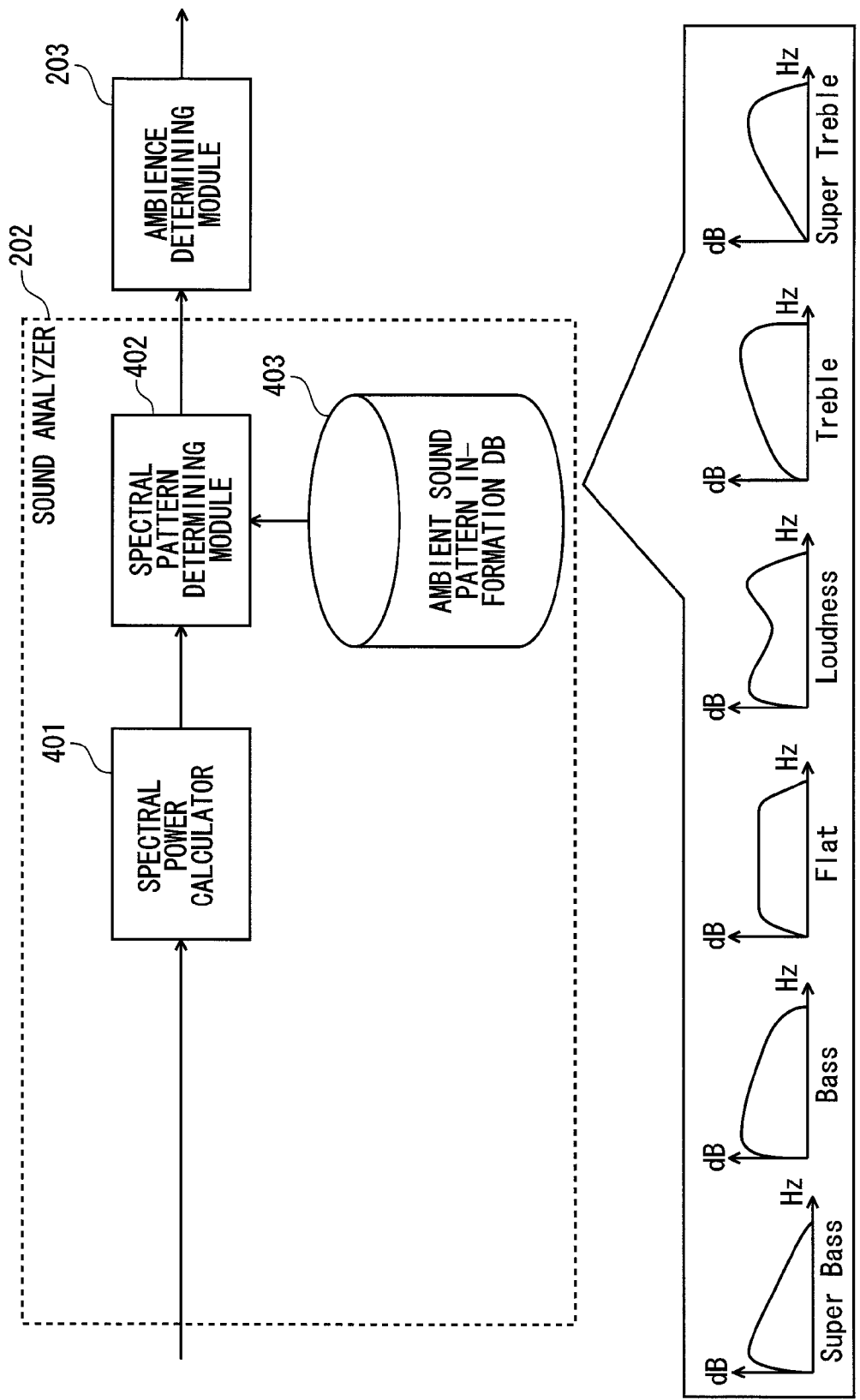
FIG. 11 is a block diagram showing the processing configuration of a sound analyzer according to the embodiment.

FIG. 11 shows the processing configuration of the sound analyzer 202. The sound analyzer includes a spectral power calculator 401, a spectral pattern determining module 402, and a spectral (ambient sound) pattern information DB 403.

The spectral power calculator 401 calculates spectral power of a sound signal and thereby determines a spectrum distribution pattern. Then, the spectral power calculator 401 determines which of spectrum distribution patterns (e.g., ones shown in FIG. 11) contained in the spectral pattern information DB 403 the determined spectrum distribution pattern is closest to.

Figure 12:
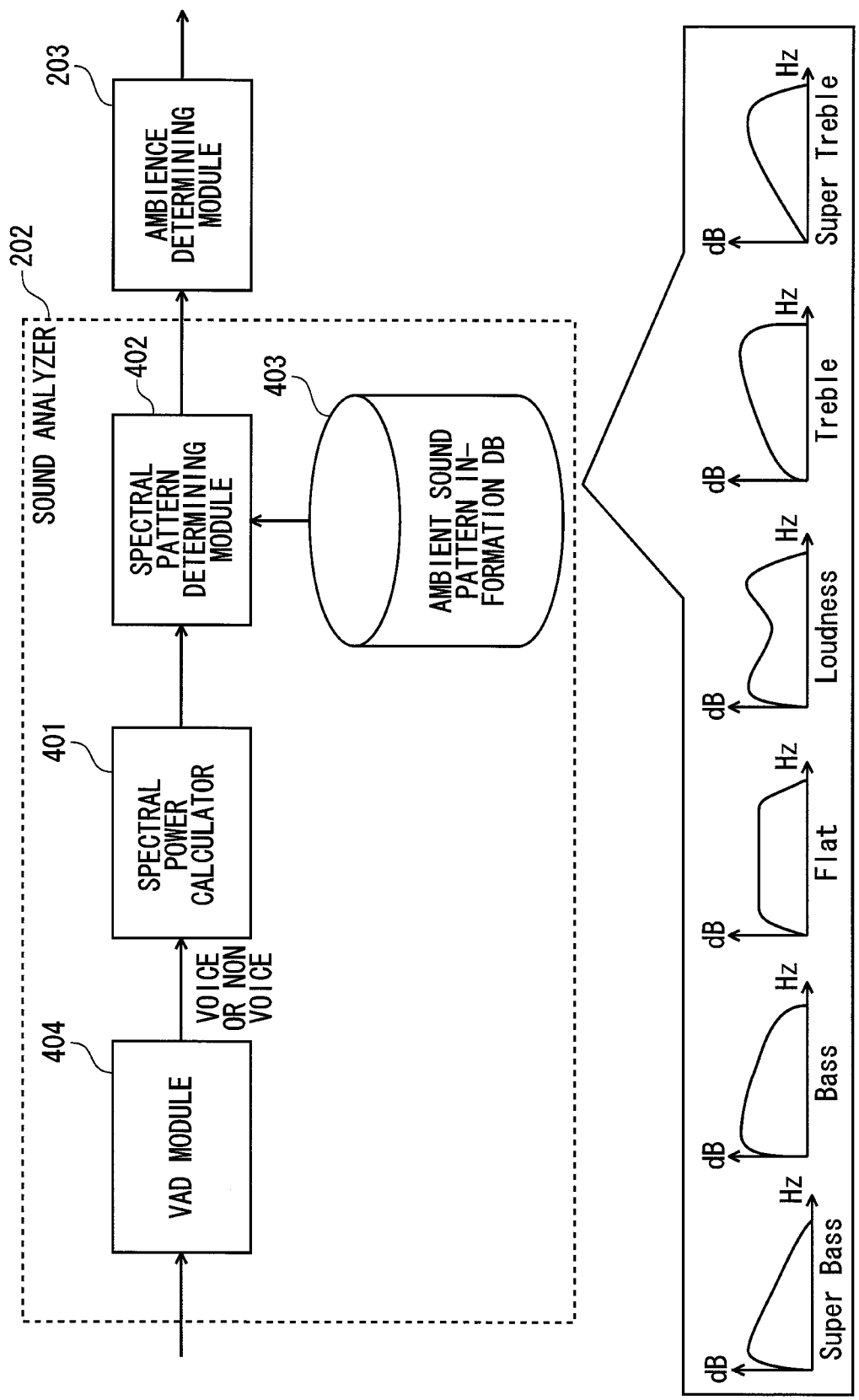
FIG. 12 is a block diagram showing a first modification of the sound analyzer of FIG. 11.
Figure 13:
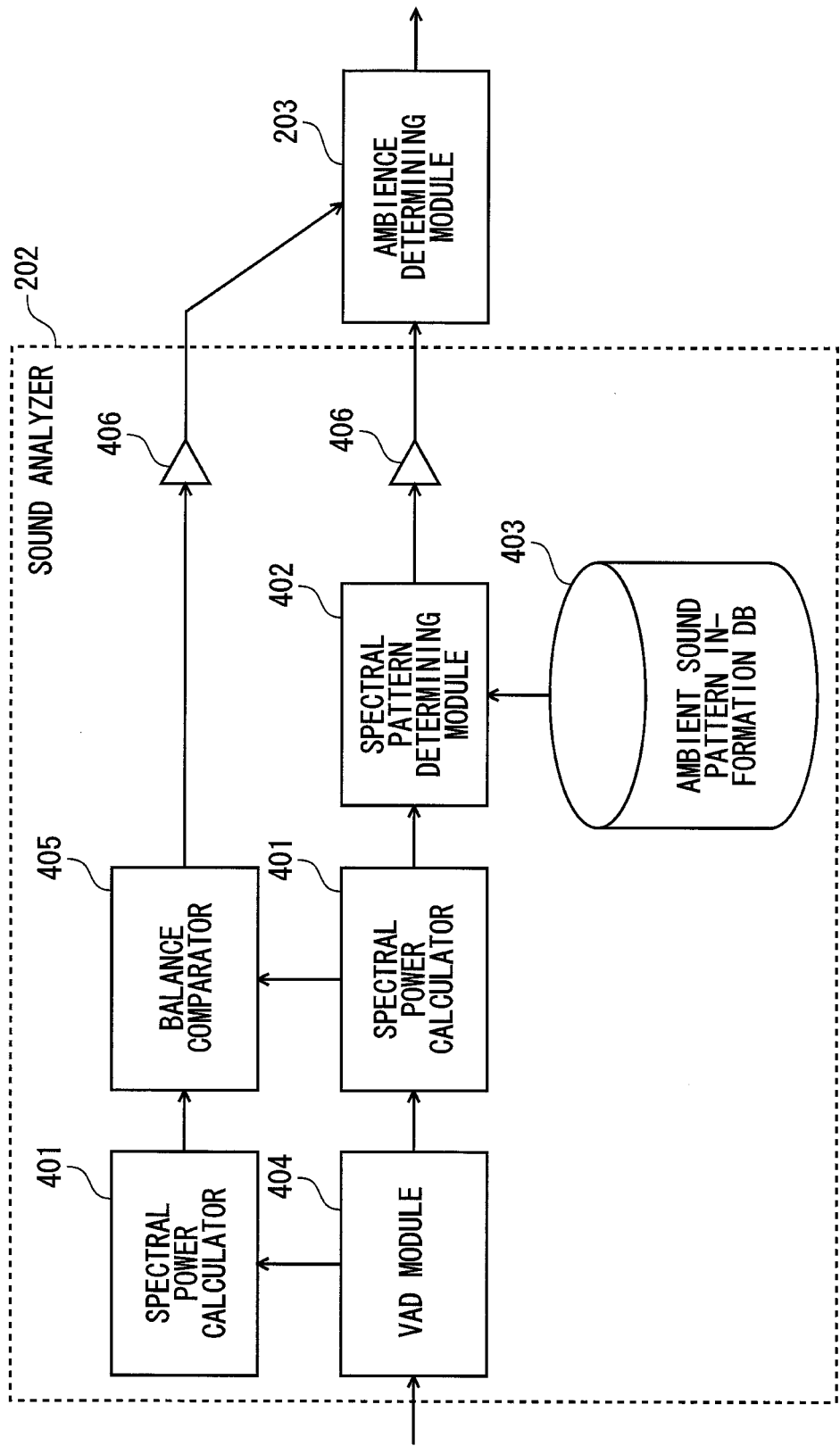
FIG. 13 is a block diagram showing a second modification of the sound analyzer of FIG. 11.

For example, if the spectral pattern determining module 402 determines that the determined spectrum distribution pattern is closest to "super bass," it is likely that the audio signal corresponds to a fireworks scene, a drums playing scene, or the like. Therefore, the ambience determining module 203 determines that an ambience is necessary. FIGS. 12 and 13 show modifications to the sound analyzer 202 of FIG. 11. In the sound analyzer 202 of FIG. 12, a VAD (Voice Activity Detection) module 404 generates VAD information before calculation of spectral power. This enables analysis of both of a vocal spectral pattern and a non-vocal spectral pattern, and thereby makes it possible to perform a particular scene determination with high accuracy for particular scenes in a wide range.

In the sound analyzer 202 of FIG. 13, a balance comoparator 405 calculates a ratio between vocal spectral power and non-vocal spectral power, which makes it possible to estimate which of vocal and non-vocal components is dominant in the content concerned. For example, if it is determined that the vocal component is dominant, audio processing which emphasizes the non-vocal component may be performed. If it is determined that the non-vocal component is dominant, audio processing which emphasizes the vocal component may be performed. Furthermore, priorities may be put on the information to be subjected to the sound analysis, for example, by multiplying the information by weight coefficients indicated by notes 406.

For example, the VAD function may be implemented by utilizing the technique described in US 2012/0029913 A1, the entire contents of which are incorporated herein by reference.

Figure 14:
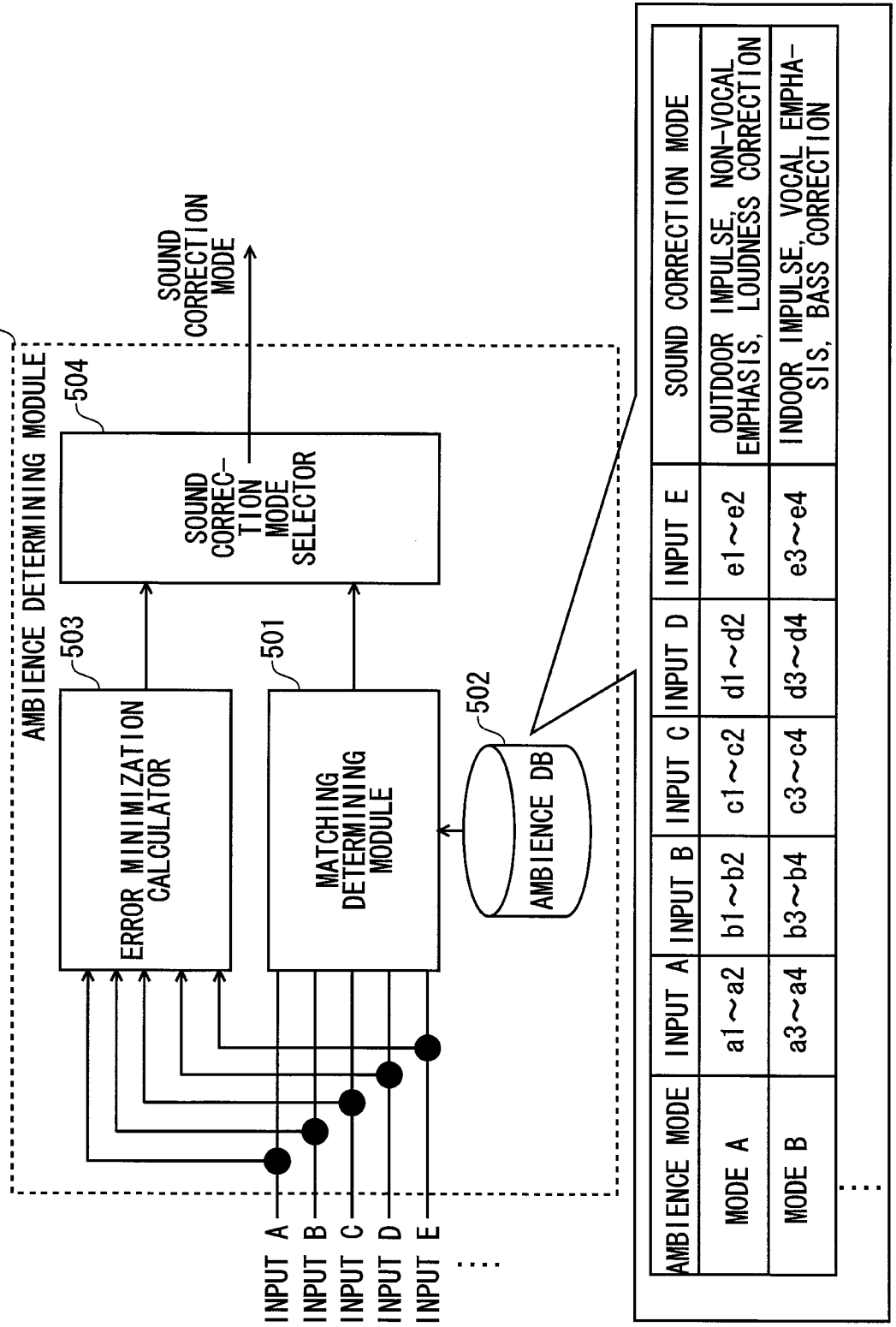
FIG. 14 is a block diagram showing the processing configuration of an ambience determining module according to the embodiment.

FIG. 14 shows the processing configuration of the ambience determining module 203. The ambiance determining module 203 includes a matching determining module 501, an ambience DB 502, an error minimization calculator 503, and a sound correction mode selector 504.

The matching determining module 501 performs a matching determination using the ambience DB 502 in which information acquired by the video analyses and information acquired by the audio analyses are registered in advance. If the determination result shows a match with a scene (an ambience mode; for example, a mode A or a mode B) that requires an ambience, the sound correction mode selector 504 makes switching to settings for an audio processing function that is suitable for the match-found mode. Even if no match is found with any of the registered ambience mode, the error minimization calculator 503 determines an ambience mode by performing, for example, the following classification processing:

, For example, it is determined that the ambience mode of the content concerned is close to the mode A if the following conditions (a) to (e) are satisfied:

(a) An input A is within the range of the mode A (a1<(input A)<a2).

(b) An input B is within the range of the mode B (b3<(input B)<b4).

(c) An input C is within the range of the mode A (c1<(input C)<c2).

(d) An input D is within the ranges of the mode A and the mode B ((d1<(input D)<d2) & (d3<(input D) d4)).

(e) An input E is within the ranges of the mode A and the mode B ((e1<(input E)<e2) & (e3<(input E) e4)).

where the inputs A-E denotes, for example, the compositional pattern, the color, the brightness, the spectral pattern, the VAD (voice or not), the power ratio (described above), etc.

Naturally, any of various kinds of processing other than the above may be employed so long as they make it possible to determine a close ambience mode when no match is found with any of the registered ambience mode. Also, the sound correction may be omitted if no close registered ambience mode is found.

Next, a description will be made of how to register modes in the ambience DB 502. Scenes containing scenes that require an ambience (for example, sport event scenes for the mode A and explosion scenes of movies for the mode B, a scene of a conversation in a cave, overseas townscape scenes, etc.) are collected. Their compositional patterns, main color component information (color information), brightness information, etc. are analyzed. Then, values that tend to occur at high probabilities are registered at the manufacture of an apparatus.

For example, with regard to the sport event scenes, it may be registered that the compositional pattern, the main color component information, and the brightness are "horizon," "blue" and "green," and "bright," respectively. It becomes possible to realize audio processing that is more suitable for a video scene that requires an ambience as the number of modes registered in the ambience DB 502 is increased.

According to the embodiments described above, since audio processing that is very suitable for each particular scene that requires an ambience is executed, a user can feel that video and audio are integrated to a lager extent and hence can enjoy multimedia viewing with a higher degree of ambience. Since no particular object is detected, the audio processing, which are suitable for more video scenes, can be performed.

(Supplemental Description on Embodiments)

1) A compositional pattern of a video signal is estimated, and audio processing is performed according to an estimation result.

2) A compositional pattern of a video signal is estimated, and a degree of correction of audio processing is varied according to an estimation result.

3) A compositional pattern of a video signal is estimated, and audio processing is switched between enabled and disabled, according to an estimation result.

4) An ambience is determined based on an estimated compositional pattern of a video signal, color information and brightness information, and audio processing is performed according to a result of the ambience determination.

5) An ambience is determined based on an estimated compositional pattern of a video signal, color information, brightness information, and past information of the color information and brightness information, and audio processing is performed according to a result of the ambience determination.

6) A spectral pattern of an audio signal is estimated, and audio processing is performed according to an estimation result.

7) A spectral pattern of an audio signal is estimated, and a degree of correction of audio processing is varied according to an estimation result.

8) A spectral pattern of an audio signal is estimated, and audio processing is switched between enabled and disabled, according to an estimation result.

9) A spectral pattern of a vocal signal is estimated by performing VAD (Voice Activity Detection) on an audio signal.

10) A spectral pattern of a non-vocal signal is estimated by performing VAD (Voice Activity Detection) on an audio signal.

11) It is determined as to whether a vocal component or a non-vocal component is emphasized, based on a result of comparison between spectral power values of a vocal signal and a non-vocal signal of an audio signal.

12) A result of analyses of a video signal and an audio signal is output as an ambience level.

13) An ambience is determined by multiplying plural results of analyses of a video signal and an audio signal by weight coefficients.

14) Optimum audio processing is selected by performing a matching determination between plural results of analyses of a video signal and an audio signal and pre-registered results.

One embodiment relates to a video linkage type audio processing apparatus configured to perform a particular scene determination by analyzing a video signal or both of a video signal and an audio signal and performs more appropriate audio processing according to a result of the particular scene determination.

An ambience determination is performed using a video composition pattern to discriminate between a particular scene for which audio processing should be performed and a non-particular scene for which audio processing should not be performed. Ambience emphasis is performed if it is determined that an ambience is necessary. An ambience determination is performed using an audio spectral pattern to discriminate between a particular scene for which audio processing should be performed and a non-particular scene for which audio processing should not be performed. The ambience emphasis is performed if it is determined that an ambience is necessary. If a particular scene/non-particular scene determination result is output as it is as tag information of an ambience level, a user can be notified as to whether or not the content concerned requires an ambience.

No particular object may be detected. Thereby, audio processing can be performed according to video scenes that more require an ambience. Furthermore, when no particular object is detected, an amount of processing can be reduced.

The invention is not limited to the above embodiments, and may be practiced in such a manner that constituent elements are modified in various manners without departing from the spirit and scope of the invention.

Various inventive concepts may be conceived by properly combining plural constituent elements disclosed in the embodiment. For example, several ones of the constituent elements of the embodiment may be omitted. Furthermore, elements of different embodiments may be combined appropriately.

What is claimed is:

1. An audio processing apparatus comprising: a compositional pattern determining module configured to estimate a compositional pattern of an input video signal; and an audio processor configured to perform audio processing according to the estimation comprising:
   a sound analyzer configured to make a spectral pattern estimation of an input audio signal; and
   an audio processor configured to perform audio processing according to the spectral pattern estimation.

2. The audio processing apparatus of claim 1, wherein the audio processor is configured to perform voice activity detection on the input audio signal to estimate the spectral pattern.

3. The apparatus of claim 1, wherein a result of an analysis which is performed based on the spectral pattern estimation is output as an ambience level instead of the audio processing.

4. An audio processing method comprising:
   estimating a compositional pattern of an input video signal;
   performing audio processing according to a result of the estimating; and
   making a spectral pattern estimation of an input audio signal; and performing audio processing according to the spectral pattern estimation.

* * * * *